United States Patent
Selvaganapathy et al.

(10) Patent No.: US 11,234,210 B2
(45) Date of Patent: Jan. 25, 2022

(54) ENERGY EFFICIENCY PAGING RECEPTION MECHANISMS

(71) Applicant: Nokia Technologies Oy, Espoo (FI)

(72) Inventors: Srinivasan Selvaganapathy, Bangalore (IN); Jürgen Hofmann, Merching (DE); Hartmut Wilhelm, Ulm (DE); Muneender Chiranji, Hyderabad (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/765,979

(22) PCT Filed: Nov. 8, 2018

(86) PCT No.: PCT/EP2018/080608
§ 371 (c)(1),
(2) Date: May 21, 2020

(87) PCT Pub. No.: WO2019/101536
PCT Pub. Date: May 31, 2019

(65) Prior Publication Data
US 2020/0367195 A1    Nov. 19, 2020

(30) Foreign Application Priority Data

Nov. 24, 2017 (IN) .............................. 201741042222

(51) Int. Cl.
*H04W 4/00* (2018.01)
*H04W 68/00* (2009.01)
(Continued)

(52) U.S. Cl.
CPC ..... *H04W 68/005* (2013.01); *H04W 36/0061* (2013.01); *H04W 36/08* (2013.01);
(Continued)

(58) Field of Classification Search
CPC .............. H04W 68/005; H04W 76/28; H04W 36/0061; H04W 36/08; H04W 36/32;
(Continued)

(56) References Cited

U.S. PATENT DOCUMENTS 9,008,655 B2 * 4/2015 Kitazoe ................. H04W 48/12
455/434
10,091,762 B2 * 10/2018 Kitazoe ................. H04W 68/02
(Continued)

FOREIGN PATENT DOCUMENTS

EP     2 672 755 A1    12/2013

*Primary Examiner* — Amancio Gonzalez
(74) *Attorney, Agent, or Firm* — Harrington & Smith (57) ABSTRACT

A method and apparatus to determine by a network node of a serving cell of a communication network signaling including at least one parameter indicating that page reception on a paging channel of a neighbor cell can be performed by a network device without system information acquisition by the network device; and send the signaling toward the network device. Further, a method and apparatus to receive by a network device of a communication network from a serving cell signaling including at least one parameter indicating that page reception on a neighbor cell by a network device can be performed by the network device without system information acquisition by the network device; and based on the signaling, listen for a paging message on a paging channel associated with the neighbor cell without system information acquisition.

15 Claims, 4 Drawing Sheets

---

510: determining by a network node of a serving cell of a communication network signaling comprising at least one parameter indicating that page reception on a paging channel of a particular neighbor cell or a set of neighbor cells can be performed by a network device without system information acquisition by the network device 520: sending the signaling comprising the at least one parameter toward the network device (51) Int. Cl.
*H04W 76/28* (2018.01)
*H04W 36/00* (2009.01)
*H04W 36/08* (2009.01)
*H04W 36/32* (2009.01)
*H04W 52/02* (2009.01)

(52) U.S. Cl.
CPC ....... *H04W 36/32* (2013.01); *H04W 52/0206* (2013.01); *H04W 76/28* (2018.02)

(58) Field of Classification Search
CPC ... H04W 52/0206; H04W 68/02; H04W 4/70; H04W 48/12; Y02D 30/70
See application file for complete search history.

(56) References Cited

U.S. PATENT DOCUMENTS

| | | | |
|---|---|---|---|
| 10,609,756 B2* | 3/2020 | Takeda | H04W 76/27 |
| 2014/0135014 A1 | 5/2014 | Li | 455/436 |
| 2015/0201355 A1* | 7/2015 | Kotreka | H04W 68/02 |
| | | | 455/436 |

* cited by examiner

FIG. 1

| Octet no. | Bit number | | | | | | | |
|---|---|---|---|---|---|---|---|---|
| | 8 | 7 | 6 | 5 | 4 | 3 | 2 | 1 |
| 1 | T1' (hi) | | BSIC (hi) | | | | | |
| 2 | T2' (hi) | | T1' (low) | | | | | |
| 3 | RACH Access Control | | EC-BCCH CHANGE MARK | | Implicit Reject Status | | T2' (low) | |
| 4 | | | BSIC (low) | | | Spare | IMM_CHANGE_MARK | |

ENERGY EFFICIENCY PAGING RECEPTION MECHANISMS

CROSS REFERENCE TO RELATED APPLICATION

This patent application is a U.S. National Stage application of International Patent Application Number PCT/EP2018/080608 filed Nov. 8, 2018, which is hereby incorporated by reference in its entirety, and claims priority to IN 201741042222 filed Nov. 24, 2017.

TECHNICAL FIELD

The teachings in accordance with the exemplary embodiments of this invention relate generally to enhanced idle mode operations and, more specifically, relate to using idle mode related system information of a previous serving cell if that cell has the same idle mode configuration as a neighbor cell, in order not to have to read the system information after cell reselection to the neighbor cell before starting to listen to paging.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
BSIC Base Station Identity Code
CIoT Cellular Internet of Things
DL Downlink
DRX discontinuous reception
EC-GSM-IoT Extended Coverage GSM for Internet of Things
EC-SCH Extended Coverage Synchronisation Channel (also referred to as sync channel)
EC SI Extended Coverage System Information
EC-CCCH Extended Coverage Common Control Channel
EC-PCH Extended Coverage Paging Channel
EC-WUCH Extended Coverage Wake-Up Channel
eDRX extended discontinuous reception
EGPRS Enhanced GPRS
FN Frame Number
GSM Global System for Mobile communications (second generation mobile radio network based on TDMA technology, basis for EC-GSM)
GPRS, (E)GPRS General Packet Radio System, Enhanced GPRS
MF multiframe (a 51-MF is 51 TDMA frames long)
MS Mobile Station
$N_B$ Number of paging occasions per DRX cycles
NB-IoT Narrowband Internet of Things
NB-MIB Master Information Block for NB-IoT
NPDCCH NB-IoT Physical DL Control Channel
PCI Physical Cell Identifier
PEO Power Efficient Operation
PSM Power Save Mode
RA Routing Area
RACH Random Access Channel
RMAX Maximum number of repetitions for the paging search space
RRM Radio Resource Management
SI System Information
TA Tracking Area
TDMA Time Division Multiple Access
UE user equipment
WUCH wake-up channel
WUS wake-up signal Extended Coverage GSM for Internet of Things (EC-GSM-IoT (CIoT) is building on GPRS/EGPRS cellular technologies for machine-type communications (MTC). NarrowBand IoT (NB-IoT) is a narrowband radio technology also being designed for IoT which is being developed to enable a wide range of devices and services to be connected using cellular telecommunications bands. NB-IoT is standardized by 3GPP. With this new CIoT systems deployments requirements continue to be identified.

New use cases such as activation of the CIoT device based on network command requires low latency for the network command which in turn requires lower eDRX cycle length in the order of few minutes. This requirement is applicable for use cases such as smart bike rental/bi-cycles where the lock at the bike needs to be opened based on network command when the user scans the bi-cycle code along with the payment. Here the activation is expected to happen within 1-2 minutes. This requires the CIoT device to be configured with an eDRX cycle in the range of few minutes.

With lowering of the eDRX cycle for the above use cases, the energy consumption for paging reception becomes the most important factor for the overall battery life time of the device. This requires further power saving for paging reception, which is not taken into account by procedures specified in 3GPP Rel-13 and Rel-14.

As part of a 3GPP work item for NB-IoT a power saving signal is introduced to reduce the energy consumption for paging reception, in particular to reduce the avoidable listening to every paging occasion. A similar mechanism is also required for EC-GSM-IoT for energy efficiency improved paging reception.

In this invention, additional enhancements are described to reduce the power consumption for paging reception and optimize system information acquisition for CIoT devices after cell reselection, such as at cell edges where the device is expected to experience frequent cell reselection followed by idle mode paging reception.

SUMMARY

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine by a network node of a serving cell of a communication network signaling comprising at least one parameter indicating that page reception on a paging channel of a particular neighbor cell or a set of neighbor cells can be performed by a network device without system information acquisition by the network device; and send the signaling comprising the at least one parameter toward the network device.

In another example aspect of the invention, there is a method comprising: determining by a network node of a serving cell of a communication network signaling comprising at least one parameter indicating that page reception on a paging channel of a particular neighbor cell or a set of neighbor cells can be performed by a network device without system information acquisition by the network device; and sending the signaling comprising the at least one parameter toward the network device.

A further example embodiment is a method comprising the method of the previous paragraph, wherein the at least one parameter causes the network device to listen for a paging message on a paging channel associated with the neighbor cell without the system information acquisition, wherein each cell of the set of neighbor cells have a same configuration for idle mode parameters related to paging reception and/or cell reselection, wherein the signaling is broadcast, and wherein the broadcast signaling comprises an information block identifying a paging group identity for the set of neighbor cells and identifying cells having a same paging configuration and idle mode parameters as the serving cell, wherein the signaling or part of it is sent in one of EC System Information and NB-IoT System Information, wherein the signalling is identifying a system information change for idle mode parameters for all cells of the set of neighbour cells, wherein the signaling or part of it is transmitted in every 2*51 MF over 4 consecutive TDMA frames of a common control channel from FN15-FN18 or over 2 TDMA frames (FN15-FN16), wherein the signaling comprises an indicator indicating one or more extended coverage common control channels configured in a same cell, wherein the indicator is indicating 4 different values using 2 Bits, wherein there is sending toward the network device signaling comprising an idle mode value tag using 2 bits, wherein the idle mode value tag keeps track of a change in idle mode mobility related parameters among the cells which have a same idle mode configuration, wherein the idle mode value tag is sent over an EC-SCH, wherein the at least one parameter is indicative of whether the neighbor cell belongs to a same tracking/routing area as the serving cell, whether the neighbor cell has a same paging configuration as the serving cell, whether the neighbor cell's and serving cell's idle mode configuration are the same, and whether cell reselection parameters in the neighbor cell are the same as in the serving cell, wherein the parameter indicative of whether the neighbor cell has the same paging configuration as the serving cell is based on at least one of a discontinuous reception cycle, a number of paging occasions within a discontinuous reception cycle of the neighbor cell, and a maximum number of repetitions of a paging message, wherein the at least one parameter is indicative of whether cell reselection parameters of the neighbor cell are same as the cell reselection parameters sent from the serving cell, wherein the at least one parameter comprises an indication of a paging cell group identifier identifying cells having a same paging configuration and idle mode parameters as the serving cell, wherein the at least one parameter comprises an idle mode value tag, and wherein the idle mode value tag is indicating whether there is a change of idle mode parameters among the group of cells during the cell reselection, wherein the serving cell signals at least one parameter indicating for at least one neighbor cell whether the neighbor cell is belonging to a same routing area as the serving cell, whether the neighbor cell has the same paging configuration as the serving cell, whether the neighbor cell supports a wake-up channel and whether the neighbor cells cell reselection parameters are same as for the serving cell, and whether a change occurred in idle mode mobility related parameters among the cells which have a same idle mode configuration, wherein the signaling is dedicated to devices in Power Efficient Operation, and wherein the signaling or part of it is sent over a common control channel of the one or more extended common control channels in each cell.

A non-transitory computer-readable medium storing program code, the program code executed by at least one processor to perform at least the method as described in the paragraphs above.

In another example aspect of the invention, there is an apparatus comprising: means for determining by a network node of a serving cell of a communication network signaling comprising at least one parameter indicating that page reception on a paging channel of a particular neighbor cell or a set of neighbor cells can be performed by a network device without system information acquisition by the network device; and means for sending the signaling comprising the at least one parameter toward the network device.

In accordance with the example embodiments as described in the paragraph above, at least the means for determining and sending comprises a network interface, and computer program code stored on a computer-readable medium and executed by at least one processor.

A further example embodiment is an apparatus comprising the apparatus of the previous paragraphs, wherein the at least one parameter causes the network device to listen for a paging message on a paging channel associated with the neighbor cell without the system information acquisition, wherein each cell of the set of neighbor cells have a same configuration for idle mode parameters related to paging reception and/or cell reselection, wherein the signaling is broadcast, and wherein the broadcast signaling comprises an information block identifying a paging group identity for the set of neighbor cells and identifying cells having a same paging configuration and idle mode parameters as the serving cell, wherein the signaling or part of it is sent in one of EC System Information and NB-IoT System Information, wherein the signalling is identifying a system information change for idle mode parameters for all cells of the set of neighbour cells, wherein the signaling or part of it is transmitted in every 2*51 MF over 4 consecutive TDMA frames of a common control channel from FN15-FN18 or over 2 TDMA frames (FN15-FN16), wherein the signaling comprises an indicator indicating one or more extended coverage common control channels configured in a same cell, wherein the indicator is indicating 4 different values using 2 Bits, wherein there is sending toward the network device signaling comprising an idle mode value tag using 2 bits, wherein the idle mode value tag keeps track of a change in idle mode mobility related parameters among the cells which have a same idle mode configuration, wherein the idle mode value tag is sent over an EC-SCH, wherein the at least one parameter is indicative of whether the neighbor cell belongs to a same tracking/routing area as the serving cell, whether the neighbor cell has a same paging configuration as the serving cell, whether the neighbor cell's and serving cell's idle mode configuration are the same, and whether cell reselection parameters in the neighbor cell are the same as in the serving cell, wherein the parameter indicative of whether the neighbor cell has the same paging configuration as the serving cell is based on at least one of a discontinuous reception cycle, a number of paging occasions within a discontinuous reception cycle of the neighbor cell, and a maximum number of repetitions of a paging message, wherein the at least one parameter is indicative of whether cell reselection parameters of the neighbor cell are same as the cell reselection parameters sent from the serving cell, wherein the at least one parameter comprises an indication of a paging cell group identifier identifying cells having a same paging configuration and idle mode parameters as the serving cell, wherein the at least one parameter comprises an idle mode value tag, and wherein the idle mode value tag is indicating whether there is a change of idle mode parameters among the group of cells during the cell reselection, wherein the serving cell signals at least one parameter indicating for at least one neighbor cell whether the neighbor cell is belonging to a same routing area as the serving cell, whether the neighbor cell has the same paging configuration as the serving cell, whether the neighbor cell supports a wake-up channel and whether the neighbor cells cell reselection parameters are same as for the serving cell, and whether a change occurred in idle mode mobility related parameters among the cells which have a same idle mode configuration, wherein the signaling is dedicated to devices in Power Efficient Operation, and wherein the signaling or part of it is sent over a common control channel of the one or more extended common control channels in each cell.

In another example aspect of the invention, there is an apparatus, such as a user equipment side apparatus, comprising: at least one processor; and at least one memory including computer program code, where the at least one memory and the computer program code are configured, with the at least one processor, to cause the apparatus to at least: receive by a network device of a communication network from a serving cell signaling comprising at least one parameter indicating that page reception on a particular neighbor cell or a set of neighbor cells by a network device can be performed by the network device without system information acquisition by the network device; and, based on the signaling, listen for a paging message on a paging channel associated with the neighbor cell without system information acquisition.

In another example aspect of the invention, there is a method comprising: receiving by a network device of a communication network from a serving cell signaling comprising at least one parameter indicating that page reception on a particular neighbor cell or a set of neighbor cells by a network device can be performed by the network device without system information acquisition by the network device; and based on the signaling, listening for a paging message on a paging channel associated with the neighbor cell without system information acquisition.

A further example embodiment is a method comprising the method of the previous paragraph, wherein each cell of the set of neighbor cells have a same configuration for idle mode parameters related to paging reception, wherein the signaling is broadcast, and wherein the broadcast signaling comprises a master information block identifying a paging group identity for the set of neighbor cells, wherein the signaling is received in one of EC System Information and NB System Information for IoT, wherein the signaling is received in every 2*51 MF over 4 consecutive TDMA frames of a common control channel from FN15-FN18 or over 2 TDMA frames (FN15-FN16), wherein the signaling comprises an indicator indicating one or more extended coverage common control channels configured in a same cell, wherein the indicator is indicating 4 different values using 2 Bits, wherein there is receiving from the serving cell signaling comprising an extended coverage value tag using 2 bits, wherein the extended coverage value tag keeps track of a change in idle mode mobility related parameters among the cells which have a same idle mode configuration, wherein the signaling comprising the extended coverage value tag is received over an EC-SCH, wherein the at least one parameter is used in place of a system information value tag, and wherein the at least one parameter is indicative of whether the neighbor cell belongs to a same tracking/routing area as the serving cell, whether the neighbor cell has a same paging configuration as the serving cell, whether the neighbor cell's and serving cell's idle mode configuration are the same, and whether cell reselection parameters in the neighbor cell are the same as in the serving cell, wherein the parameter indicative of whether the neighbor cell has the same paging configuration as the serving cell is based on at least one of a discontinuous reception cycle, and a number of paging occasions within a discontinuous reception cycle of the neighbor cell, wherein the at least one parameter is indicative of whether cell reselection parameters of the neighbor cell are same as the cell reselection parameters sent from the serving cell, wherein the at least one parameter comprises an indication of a paging cell group identifier identifying cells having a same paging configuration and idle mode parameters as the serving cell, wherein there is reading a physical cell identifier from the neighbour cell as part of cell reselection; based on the at least one parameter indicating that the neighbor cell having the same paging configuration as the serving cell, listen for the paging message on the paging channel without prior acquiring system information of a new serving cell selected by the network device, wherein there is, after synchronization, using the information sent in an extended coverage synchronization channel and at least in one extended coverage common control channel of a number of extended coverage common control channels in the new serving cell to identify an extended coverage common control channel block corresponding to a paging group of the new serving cell without the system information acquisition by the network device, and wherein there is receiving in the serving cell at least one parameter indicating at least one of whether each cell of a set of neighbor cells is belonging to a same routing area as the serving cell, whether each cell of a set of neighbor cells has the same paging configuration as the serving cell, whether each cell of a set of neighbor cells supports a wake-up channel, whether for each cell of a set of neighbor cells the cell reselection parameters are same as for the serving cell, and whether a change occurred in idle mode mobility related parameters among the cells which have a same idle mode configuration; after cell reselection and synchronization to the new serving cell, using the information, sent at least in one common control channel of a number of common control channels in the new serving cell, to identify a common control channel block corresponding to a paging group of the new serving cell without system information acquisition by the network device and to identify a change of idle mode mobility parameters in the new serving cell; and using this information to determine whether to read system information of the new serving cell prior to monitoring of paging messages, wherein the network device has been configured to maintain Power Efficient Operation.

A non-transitory computer-readable medium storing program code, the program code executed by at least one processor to perform at least the method as described in the paragraphs above.

In another example aspect of the invention, there is an apparatus comprising: means for receiving by a network device of a communication network from a serving cell signaling comprising at least one parameter indicating that page reception on a particular neighbor cell or a set of neighbor cells by a network device can be performed by the network device without system information acquisition by the network device; and means, based on the signaling, for listening for a paging message on a paging channel associated with the neighbor cell without system information acquisition.

In accordance with the example embodiments as described in the paragraph above, at least the means for receiving and listening comprises a network interface, and computer program code stored on a computer-readable medium and executed by at least one processor.

A further example embodiment is an apparatus comprising the apparatus of the previous paragraphs, wherein each cell of the set of neighbor cells have a same configuration for idle mode parameters related to paging reception, wherein the signaling is broadcast, and wherein the broadcast signaling comprises a master information block identifying a paging group identity for the set of neighbor cells, wherein the signaling is received in one of EC System Information and NB System Information for IoT, wherein the signaling is received in every 2*51 MF over 4 consecutive TDMA frames of a common control channel from FN15-FN18 or over 2 TDMA frames (FN15-FN16), wherein the signaling comprises an indicator indicating one or more extended coverage common control channels configured in a same cell, wherein the indicator is indicating 4 different values using 2 Bits, wherein there is receiving from the serving cell signaling comprising an extended coverage value tag using 2 bits, wherein the extended coverage value tag keeps track of a change in idle mode mobility related parameters among the cells which have a same idle mode configuration, wherein the signaling comprising the extended coverage value tag is received over an EC-SCH, wherein the at least one parameter is used in place of a system information value tag, and wherein the at least one parameter is indicative of whether the neighbor cell belongs to a same tracking/routing area as the serving cell, whether the neighbor cell has a same paging configuration as the serving cell, whether the neighbor cell's and serving cell's idle mode configuration are the same, and whether cell reselection parameters in the neighbor cell are the same as in the serving cell, wherein the parameter indicative of whether the neighbor cell has the same paging configuration as the serving cell is based on at least one of a discontinuous reception cycle, and a number of paging occasions within a discontinuous reception cycle of the neighbor cell, wherein the at least one parameter is indicative of whether cell reselection parameters of the neighbor cell are same as the cell reselection parameters sent from the serving cell, wherein the at least one parameter comprises an indication of a paging cell group identifier identifying cells having a same paging configuration and idle mode parameters as the serving cell, wherein there is reading a physical cell identifier from the neighbour cell as part of cell reselection; based on the at least one parameter indicating that the neighbor cell having the same paging configuration as the serving cell, listen for the paging message on the paging channel without prior acquiring system information of a new serving cell selected by the network device, wherein there is, after synchronization, using the information sent in an extended coverage synchronization channel and at least in one extended coverage common control channel of a number of extended coverage common control channels in the new serving cell to identify an extended coverage common control channel block corresponding to a paging group of the new serving cell without the system information acquisition by the network device, and wherein there is receiving in the serving cell at least one parameter indicating at least one of whether each cell of a set of neighbor cells is belonging to a same routing area as the serving cell, whether each cell of a set of neighbor cells has the same paging configuration as the serving cell, whether each cell of a set of neighbor cells supports a wake-up channel, whether for each cell of a set of neighbor cells the cell reselection parameters are same as for the serving cell, and whether a change occurred in idle mode mobility related parameters among the cells which have a same idle mode configuration; after cell reselection and synchronization to the new serving cell, using the information, sent at least in one common control channel of a number of common control channels in the new serving cell, to identify a common control channel block corresponding to a paging group of the new serving cell without system information acquisition by the network device and to identify a change of idle mode mobility parameters in the new serving cell; and using this information to determine whether to read system information of the new serving cell prior to monitoring of paging messages, wherein the network device has been configured to maintain Power Efficient Operation.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, there is proposed a method and apparatus using system information acquisition after cell reselection to optimize enhanced coverage and Cellular Internet of Things operations.

Example embodiments of the invention relate to energy efficient paging reception mechanism for NB-IoT and EC-GSM-IoT idle mode operation enhancements targeted for 3GPP Rel-15 and beyond (in particular by receiving the paging in a new serving cell after a cell reselection without prior acquisition of the system information). Further, this is not limiting as the example embodiments of the invention may be performed with devices using other radio technologies, such as legacy radio communication technologies.

With commercial deployments for CIoT systems beginning, new scenarios and requirements are being identified compared to the initial scope for CIoT systems. The battery life time of the CIoT device is typically estimated only considering the transmission of the uplink report with different periodicity as per the traffic profile corresponding to energy meter reporting. The power consumption of the UE/MS waking up for paging is typically not considered in such evaluations as the UE/MS is expected to be in PSM mode or long eDRX cycle with a length of more than 30 minutes being configured. In this case the energy consumption for paging reception is lesser compared to the energy consumed for transmission of the uplink report.

New use cases at the time of this application, such as for activation of the CIoT device based on a network command, require low latency for delivery of the network command which in turn requires lower eDRX cycle length in the order of few minutes. This requirement is applicable for use cases such as smart bike rental/bi-cycles where the lock at the bike needs to be opened based on network command when the user scans the bi-cycle code along with the payment. Here the activation is expected to happen within 1-2 minutes. This requires the CIoT device to be configured with an eDRX cycle in the range of a few minutes.

With lowering of the eDRX cycle for the above use cases, the energy consumption for paging reception becomes the most important factor for the overall battery life time of the device. This requires further power saving for paging reception, in particular after a cell reselection, which is not taken into account by procedures as specified in 3GPP releases at the time of this application.

As similarly stated above, the example embodiments of the invention provide additional enhancements described herein to improve the power saving for paging reception for CIoT devices (in particular those with low mobility) such as at cell edges where the device is expected to experience frequent cell reselection followed by idle mode paging reception.

As an example of a present problem, when UE is configured with eDRX cycle, the UE is required to perform following tasks in idle mode in addition to paging reception:
  The UE needs to measure the serving cell for at least few times configured for each eDRX cycle. As part of the serving cell measurements for maintaining network synchronization, UE needs to reconfirm the serving cell and measure the serving cell signal strength; and
  Based on serving cell measurements impacting cell reselection criteria, the UE may trigger a cell reselection to select a suitable cell for idle mode camping. After cell reselection, the UE will synchronize to the new cell and also acquire necessary system information in the new cell prior to paging reception. Hence, the UE needs to be sufficiently awakened before the paging reception to complete these tasks.

Where for UE with low mobility or deployed at cell edges, frequent cell reselection is expected even if relaxed mobility measurement requirements are adopted, and the cell reselections are expected to impact the battery life time of the UE. For such scenarios, further means for energy saving need to be investigated including optimization of system information acquisition after cell reselection.

In 3GPP standards submissions at the time of this application relaxed mobility requirements are introduced for PEO and EC-GSM-IoT devices. This relates to a lower frequency of serving cell measurements for the purpose of cell reselection, i.e. every 30 sec versus 5 sec for legacy (E)GPRS MS cell reselection criteria are checked, based on serving cell measurements including BSIC detection, with the defer of neighbour cell measurements to the period after one of the cell reselection criteria is met, i.e. once the serving cell is considered as non-suitable cell. After cell reselection, the device is mandated to immediately read the system information in the new cell.

To improve the situation for stationary devices, there is a hysteresis for the cell reselection that prevents toggling back and forth between two cells with similar Rx level. However, this does not help for devices that are non-stationary and moving inside the same routing or tracking area (routing/tracking area).

As part of 3GPP standards submissions at the time of this application, a power saving signal is introduced to reduce the energy consumption for paging reception, in particular to reduce the avoidable listening to every paging occasion.

Beyond this, no prior art is known for mechanisms to improve energy efficiency for CIoT devices for idle mode paging reception. The example embodiments of the invention address at least these energy efficiency improvement aspects.

These issues and problems of the prior art are applicable both for NB-IoT and EC-GSM-IoT based CIoT networks and also for any networks with the same or differing communication technologies that support PEO devices.

For UE with low mobility or deployed at cell edges, frequent cell reselection is expected even if relaxed mobility measurement requirements are adopted, and the cell reselections are expected to impact the battery life time of the UE. For such scenarios, further means for energy saving need to be investigated including optimisation of system information acquisition after cell reselection.

This problem is applicable both for NB-IoT and EC-GSM-IoT based CIoT networks and also to networks supporting PEO devices as well as to NB-IoT, EC-GSM-IoT and PEO devices.

The system information acquisition after cell reselection in idle mode can be optimized with the following modifications to the system acquisition sequence after cell reselection prior to paging reception.

Figure 4:
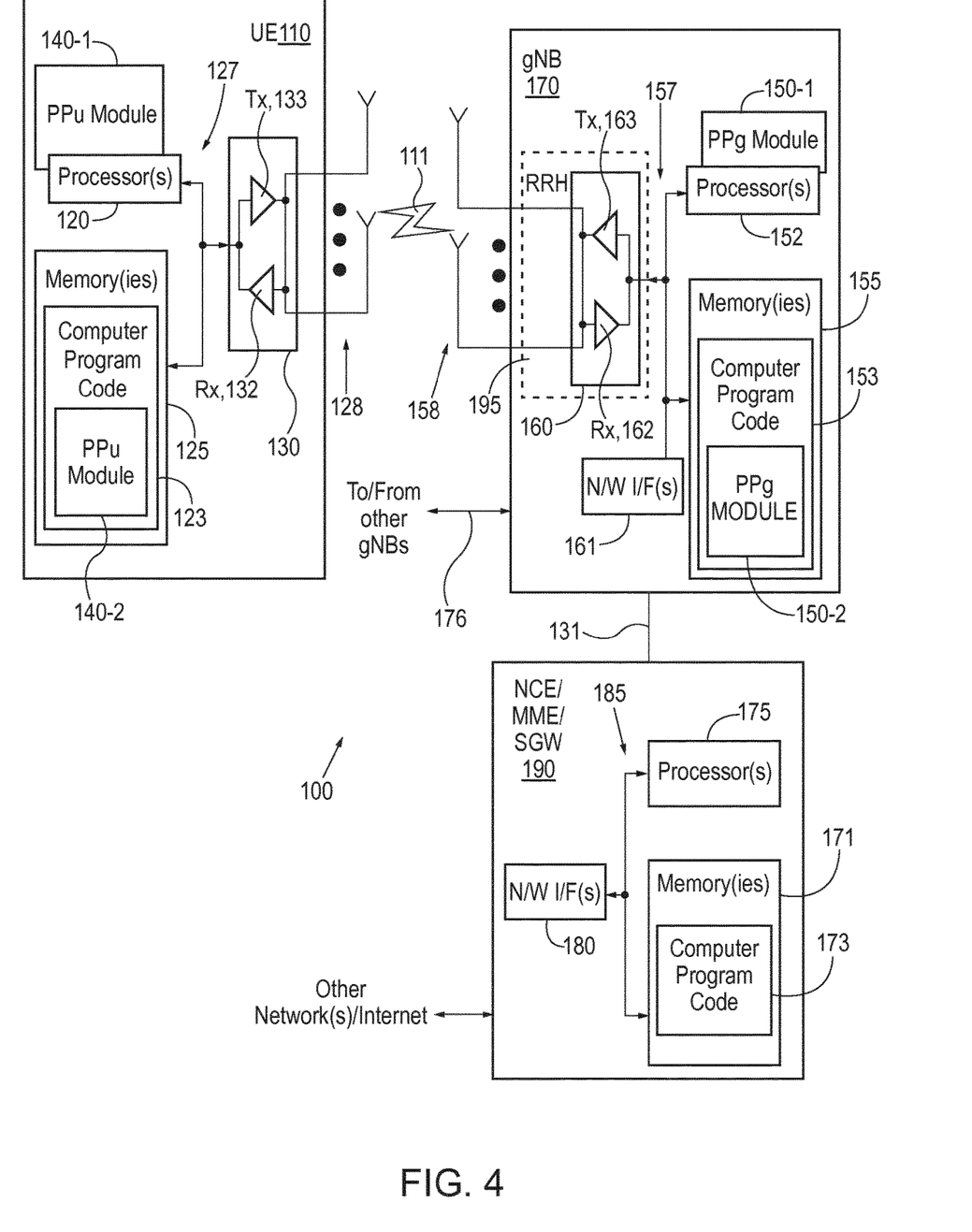
FIG. 4 shows a high level block diagram of various devices used in carrying out various aspects of the invention.

Before describing the example embodiments of the invention in further detail reference is made to FIG. 4. FIG. 4 shows a block diagram of one possible and non-limiting exemplary system in which the exemplary embodiments may be practiced. In FIG. 4, a user equipment (UE) 110 is in wireless communication with a wireless network 100. A UE is a wireless or wired device, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 can include a page processor for user device (PPu) module 140 which is configured to perform the example embodiments of the invention as described herein. The PPu module 140 comprising one of or both parts 140-1 and/or 140-2, which may be implemented in a number of ways. The PPu module 140 may be implemented in hardware as PPu module 140-1, such as being implemented as part of the one or more processors 120. The PPu module 140-1 may be implemented also as an integrated circuit or through other hardware such as a programmable gate array. In another example, the PPu module 140 may be implemented as PPu module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution, for GSM/(E)GPRS) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a page processor for gNB (PPg) module 150 which is configured to perform example embodiments of the invention as described herein. The PPg module 150 comprising one of or both parts 150-1 and/or 150-2, which may be implemented in a number of ways. The PPg module 150 may be implemented in hardware as PPg module 150-1, such as being implemented as part of the one or more processors 152. The PPg module 150-1 may be implemented also as an integrated circuit or through other hardware such as a programmable gate array. In another example, the PPg module 150 may be implemented as PPg module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium or other device that may be any media or means that can contain or store the instructions for use by or in connection with an instruction execution system, apparatus, or device, such as a computer.

Enhancements for System Information acquisition after Cell Reselection for NB-IoT As the UE only needs to listen to the paging channel for every (e)DRX cycle in idle mode, it is not necessary to acquire all the system information after cell reselection in idle mode. If the UE knows that the reselected cell belongs to same tracking/routing area and has the same configuration related to idle mode mobility (such as paging configuration, cell reselection related thresholds) as the serving cell, the UE can directly read the paging message or the corresponding wake-up signal without acquiring the system information in the new cell. The UE may also continue with serving cell measurements of new cell within DRX or eDRX cycle without reading system information. However, the system information acquisition in the new cell needs to be performed prior to the UE access attempt, if the UE wants to send uplink data. With this change the energy consumption for idle mode UE at cell edge and having low mobility can be reduced significantly.

At high level, the example embodiments of the invention provide at least the following changes to eNB and UE behavior:

Intra/Inter-frequency neighbour cell information broadcasted from eNB includes additional parameter indicating that page reception on cell reselection to this cell without system information acquisition in the new cell is possible or not. The new parameter can be called as "Idle-mode-configuration-same-as-Serving-cell";

This new parameter will be set to YES if:
the neighbouring cell belongs to the same routing/tracking area, and/or
the neighbouring cell shares the same paging configuration (Paging DRX, $N_B$ (Number of paging occasions within DRX cycle), RMAX value for search space) with the serving cell, and/or
cell reselection parameters of the new cell are same as Sintrasearch/Sintersearch broadcasted by the serving cell;

This new parameter can depend on at least one of:
the neighbor cell's tracking area,
the neighbor cell's paging configuration,
the neighbor cell's cell reselection parameters;

A new value tag is introduced to indicate change of parameters related to idle mode configuration for a group of cells. On cell reselection, UE checks this idle mode value tag before listening to the paging channel in the new cell. This value tag is also referred to as "idle-mode-config-value-tag". The idle-mode-config-value-tag in a group of cells having common parameters related to idle mode configuration is the same in all cells of the group and changes (e.g. cyclically within a limited set of possible values) each time that the group's parameters related to idle mode configuration are modified. If the idle-mode-config-value-tag in the new serving cell differs from the idle-mode-config-value-tag in the previous serving cell although both the previous and the new cell are members of the same group of cells, an explanation is that the group's parameters related to idle mode configuration were changed. Hence in this case the UE has to acquire the system information of the new serving cell;

In addition, for NB-IoT system the NB-MIB which the UE reads in the new cell includes an additional parameter indicating the support for the WUS in that cell. This parameter along with the information the UE received through neighbour cell information in the previous serving cell is then used by the UE to decide on direct paging reception in the new cell without system information reading;

When the UE reselects to new PCI from serving cell as part of cell reselection, if this cell is marked as "Idle-mode-configuration-same-as-Serving-cell", UE will directly start listening to the paging channel (NPDCCH) on the paging occasion without system information acquisition phase. If there is a page received for UE and if the UE need to respond for paging, further system information related to random access is acquired prior to random access. Alternatively, the UE may use the parameters broadcasted in last serving cell, related to RRM measurements for the serving cell if the "Idle-mode-configuration-same-as-Serving-cell" is set to YES; and In order to further improve the system information acquisition for random access, the paging message can optionally include the random access related system information. If the available bits are not sufficient to include the random access related system information, the scheduling information for NB-SIB which carries the random access related information can be included here.

Another option which provides a higher flexibility for paging configuration is to introduce NB-MIB2 which is sent in different subframe containing same information as NB-MIB1 and includes parameters related to paging configuration instead of system information value tag and SIB1 scheduling related information. The UE which reselects to a cell belonging to the same tracking area checks NB-MIB2 directly to receive the paging information. In this option:

A NB-MIB2 message in the new cell can optionally include the random access related system information for the new cell. Alternatively, the UE may use the parameters broadcasted in last serving cell, related to random access parameters for the new cell, if also broadcasted there.

Enhancements for System Information Acquisition after Cell Reselection for EC-GSM-IoT In accordance with the example embodiments of the invention there are enhancements to enable direct paging reception after cell reselection without preceding system information acquisition in the new cell; following modifications are required in EC-GSM-IoT base station subsystem and MS.

Such enhancements including:
EC SI Changes to Include Additional Information for Neighbour Cells EC SI carrying neighbour cell configuration will include the following additional information related to an identification of a neighbour base station (e.g., associated with a neighbor BSIC):

Parameter to indicate whether the cell belongs to the same routing area or not; and/or
Parameter to indicate whether the cell reselection related parameters are same as for the serving cell or not.

EC-SCH Changes and Introduction of New Common Control Channel EC-WUCH

EC-SCH channel includes an indicator (e.g. with the size of one bit) which indicates whether the cell supports enhancements for paging reception or not (i.e. whether the cell supports the wake-up channel (EC-WUCH) or not).

New common Control channel EC-WUCH is transmitted in every 2*51 MF or 4*51-MF in 4 TDMA frames from FN15-FN18 or in 2 TDMA frames (FN15-FN16) with each of the bursts carrying following information. (Alternatively, the following information may be carried by the EC-WUCH bursts in the same 51-MF.)

EC-CCCH-CHAN—Number of configured EC-CCCH channels in the cell: length of 2 bits (indicating a range of 1 . . . 4 channels) and/or
EC-Idle-Mobility-Value-Tag: a (sequence number) counter supporting at least 3 different values, e.g., consisting of 2 or more bits.

This information can be included in EC-SCH or can be part of EC-WUCH depending on the available bits in each of the channels. One possible implementation of having this value tag in EC-SCH to keep track of change of idle mode mobility related parameters among the cells which have the same idle mode configuration. The value of the Value-Tag may be incremented when changing the idle mode configuration. Other operations when changing the idle mode configuration may be possible, e.g., decrementing the value, inverting one of the 2 or more bits, where the bit position may indicate which configuration parameters or set of configuration parameters have to be acquired from SI.

EC-PCH Changes

In order to further improve MS power saving related to system information acquisition for random access, the paging message can optionally include the random access related system information. Hence the EC-PCH channel depending on the number of spare bits available includes the EC-RACH related system information so that if the MS receives a page for it, the MS need not acquire the system information prior to RACH access. If the available bits in the EC-PCH block are not sufficient to carry all the system information related to random access, this block may include the scheduling information (periodicity/51 MF number) where the next instance of the system information detailing the parameters for random access in the new cell is expected. With this change the MS can avoid reading unnecessary system information blocks. Not acquiring the system information prior to RACH access saves energy compared with receiving the required system information and allows for a faster random access in response to the paging compared with a receiving of system information between the paging and the random access.

Modified MS Behavior on Cell Reselection

If the MS reselects to a cell with a different identification value (e.g. a different BSIC) which, in the previous serving cell's neighbor cell information, is marked as an identification value (BSIC) belonging to the same routing/tracking area as the previous serving cell as part of EC System Information received in the previous serving cell, then:

MS checks support for WUS from EC-SCH as part of network synchronization and if supported MS reads the new channel EC-WUCH on FN15-FN18 (or FN15-FN16) transmitted in every odd 51-MF (or every four 51-MF) to know the number of EC-CCCH in the new cell (EC-CCCH-CHAN) for deriving the paging configuration and also the EC-Idle-Mobility-Value-Tag;

If the EC-Idle-Mobility-Value-Tag is same as the value tag of last serving cell, MS assumes no change of system information related to idle mode mobility and attempts to read the EC-PCH directly without system information acquisition; and/or MS knows the number of EC-CCCH in the new cell (EC-CCCH-CHAN) for deriving the paging configuration based on the information in EC-WUCH and starts listening to its paging group of the EC_CCCH_GROUP or the wake-up signal associated with its paging group.

Based on the above indicated methods, some aspects of the example embodiments of the invention can be described as follows:

In a cellular system with multiple cells providing services towards UE, if a group of cells have common configurations for a set of parameters related to idle mode mobility and if the change of these parameters within the group of cells is also synchronized, it is possible to optimize energy consumption related to idle mode cell reselection and subsequent reception of paging in a new cell. To this end, an idle mode value tag is used that has the same value in the group of cells which have a common configuration for a set of parameters related to idle mode mobility.

In addition, the following methods in accordance with the example embodiments when performed at a base station and/or UE work to minimize the system information acquisition after idle mode cell reselection.

Methods for System Information Changes for Neighbour-Cells (Base Station)

Methods for system information changes for neighbour cells in accordance with the example embodiments of the invention include:

Method where serving cell indicates whether the UE shall continue its idle mode operation mainly receiving the paging message in a neighbour cell without reading system information or not for each or any one or more of the neighbour cells broadcasted in the system information; and/or Method where serving cell indicates in the system information whether neighbour cell belongs to same cell group as serving cell or not. The cell group here refers to the group of cells where UE mobility within cells of this cell group does not require a communication to the core network about the cell change and also these groups share common paging configuration and cell reselection related configurations.

Methods Related to Change of MIB or Information Contents of Sync Channel (Base Station)

Methods related to change of MIB or Information contents of Sync Channel in accordance with the example embodiments include:

Method where base station includes the paging cell group identifier information in a broadcast message (e.g. MIB) where this value is same across all the cells having same idle mode parameters such as paging configuration and idle mode reselection parameters. On cell reselection to a new cell, the UE checks this identifier to decide on whether to read system information before receiving the paging message;

Method where base station includes idle mode value tag to help the UEs keep track (in an energy-efficient manner) of change of idle mode parameters during cell reselection among a group of cells which have same idle mode configuration. If the previous and the new cell are in the same group of cells with common idle mode configuration, the UE further checks the idle mode value tag in the new cell, and if it differs from the last value of the idle mode value tag that the UE read in the previous cell, the UE reads the system information before receiving the paging message. One way to find out whether the previous and the new cell are in the same group of cells with common idle mode configuration may be to check if the paging cell group identifier is the same for both cells. Another way may be to use neighbor cell information received in the previous serving cell; and/or Method where the synchronization channel of the new cell (or the system information in the serving cell) conveys additional information on support for a wake-up signal and also a pointer to a wake-up configuration channel (e.g. EC-WUCH) which contains the wake-up paging configuration of the cell.

Additional UE Operations

Methods for a UE and/or MS in accordance with the example embodiments include:

Method where the mobile station after network synchronization to a new cell after cell reselection, based on the physical cell identifier of the cell and the system information received in the previous serving cell, decides to skip reading system information before receiving the paging message for the mobile station in the new cell;

Method where the UE after network synchronization to a new cell after cell reselection, based on the physical cell identifier and/or the paging cell group identifier of the new cell and the system information received in an earlier serving cell of the same group of cells with common idle mode configuration, decides to skip reading system information before beginning to receive the paging channel for the UE in the new cell. Skipping to read the system information before beginning to receive the paging channel in the new cell may further require that the UE did not leave the earlier serving cell's group of cells with common idle mode configuration and/or that the idle mode value tag did not change since the last reading of the system information in the earlier serving cell;

Method where the mobile station after network synchronization to a new cell belonging to the same routing/tracking area uses the information in the synchronization channel (e.g. EC-SCH) and in the new common control channel (e.g. EC-WUCH) in the new cell to identify the EC-CCCH block corresponding to its paging group without reading system information in the new cell before beginning to listen to the paging in the new cell; and/or Method where the mobile station, based on system information in the serving cell, evaluates if the new cell is in another routing area than the serving cell and prioritizes a cell in the same routing/tracking area in case of similar received signal level (i.e. difference for best cell and best cell in the same routing/tracking area is in a given range) to avoid transmission of routing/tracking area updates, e.g. at RA/TA boundaries this is expected to happen more often.

New parameter can be added such as for NB-IoT to the IntraFreqNeighCellInfo which indicates whether a paging configuration of a neighbour cell is the same as for current cell/serving cell or not.

The new parameter indicates that the neighbour cell has the same configuration for routing/tracking area, paging configuration and cell reselection related configurations. These pieces of information are part of System Information Block Type 1-NB and System Information Block Type 2-NB. The new parameter is applicable for System Information Block Type 5-NB.

For another variant, a new identifier called paging cell group identifier is defined. Cells with the same idle mode configuration can be members of the same paging cell group and use the same paging cell group identifier value. This paging cell group identifier is included in the Master Information Block-NB message. Number of bits for this paging cell group identifier can be pre-defined based on maximum number of such groups. Such a paging cell group is preferably a subset of a tracking/routing area which results in at least as many paging cell groups as there are tracking (or routing) areas in a network. Paging cell group identifiers may be reused. However, in order to avoid ambiguities, adjacent paging cell groups have different paging cell group identifiers. It is expected that hence at least 3 bit will be needed to signal the paging cell group identifier.

Figure 1:
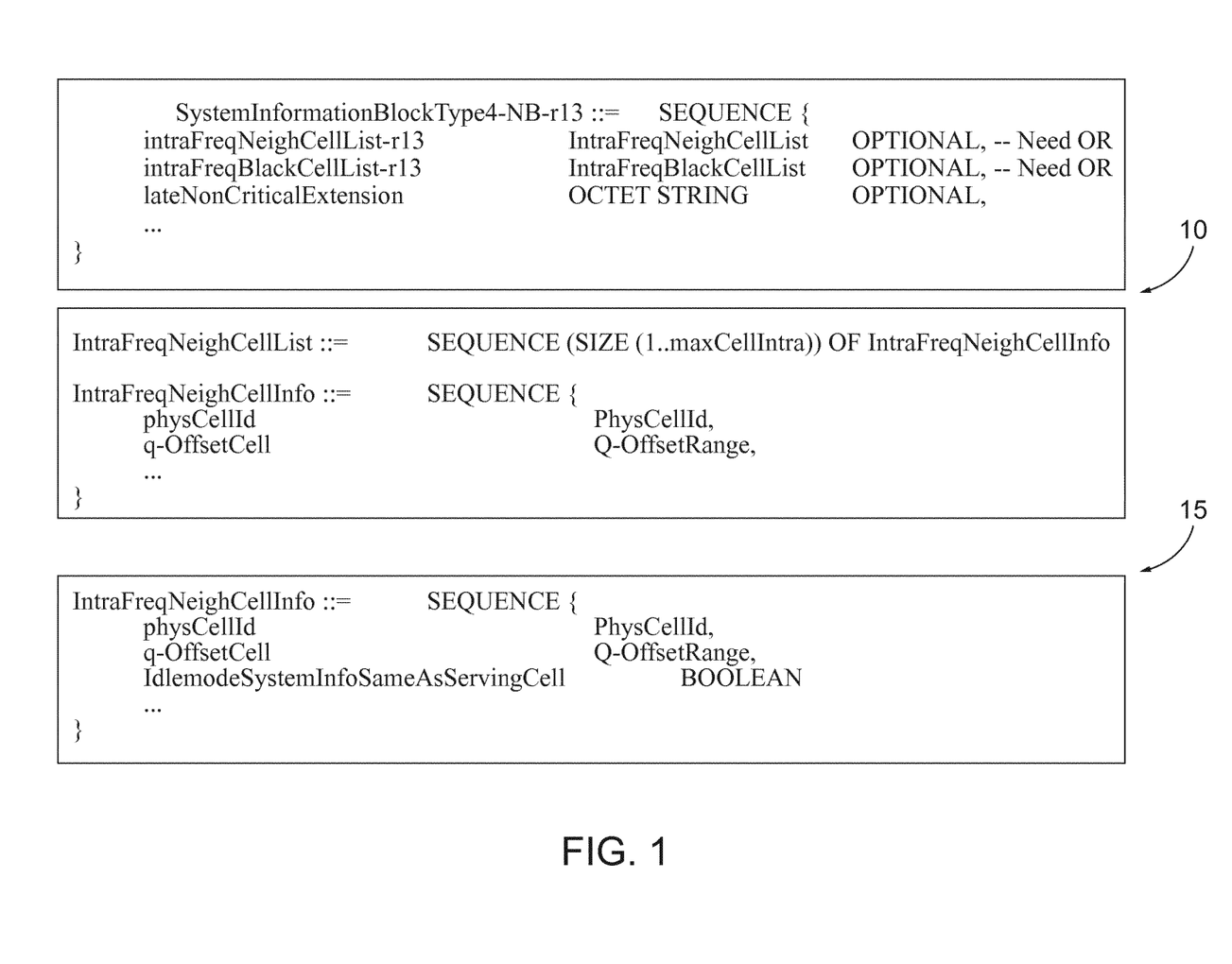
FIG. 1 shows a System Information Block Type 4-NB from an existing specification with an addition in red font at the bottom.

FIG. 1 shows a System Information Block Type 4-NB message definition 10 in an existing specification (3GPP TS 36.331 version 14.4.0). System Information item 15 shows a new parameter in accordance with the example embodiments which may be added to the IntraFreqNeighCellInfo which indicates whether or not a paging configuration in a neighbor cell is the same as in the current/serving cell.

Possible Realization of Proposed Invention for EC-GSM-IoT and PEO

EC System Information Type 2 of serving cell indicates whether each or any one or more broadcasted neighbour cell:

belongs to the same routing area as the serving cell and as well uses the same cell reselection parameters as the serving cell or not (e.g., via an indicator with values SAME-RA-SAME-RESELECT-PARAM, DIFFERENT-RESELECT-PARAM referring to both situations, or an indicator of length 1 bit where bit value 1 indicates usage of same reselection parameters, value 0 indicates usage of different reselection parameters); and/or supports a wake-up channel (EC-WUCH).

The above two settings may be signaled, e.g. in EC SI 2 in the neighbor cell related information (for example using 2 bit per neighbor cell).

By the neighbor cell information, the MS knows which neighbor cells belong to the same routing area and have the same cell reselection parameters as the serving cell. If any parameter changes in the serving cell that requires that the MS re-reads the system information, the EC-BCCH CHANGE MARK (cf. FIG. 2) will change, and the MS will detect this change when reading the EC-SCH. In the case of a cell reselection, the MS will benefit from an idle mode value tag that is aligned in the cells in the same routing area having the same cell reselection parameters. (If the cell reselection parameters of the group of cells in the same routing area with the same cell reselection parameters change, the cell reselection parameters and the idle mode value tag will change in all cells of this group at the same time.) Such an idle mode value tag is the (e.g. 2 bit) idle mode mobility change mark indication IMM_CHANGE_MARK which is also transmitted on the EC-SCH (cf. FIG. 2). If the idle mode mobility change mark indication has the same value before the cell reselection (i.e. in the previous serving cell) and after the cell reselection (i.e. in the new serving cell), the MS can conclude that the cell reselection parameters did not change during the cell reselection and hence the MS need not read the new cell's system information before beginning to listen to the paging. The values of the idle mode mobility change mark indication can include (depicted code words below are exemplary):

if the cell does not support EC-WUCH, always a first codeword such as "00" is signalled. This identifies a cell adopting legacy behaviour for paging reception as specified in Rel-13; and/or if the cell supports EC-WUCH, a different codeword than the first codeword, e.g. either "01", "10" or "11", is signalled. Each time the routing area assignment or cell reselection parameters in the cell changes, the IMM_CHANGE_MARK is changed, but not to the first codeword. For example, it is incremented, and if "11" is to be incremented, "01" is selected, thus allowing the MS to distinguish between 3 different states of the change mark.

Figure 2:
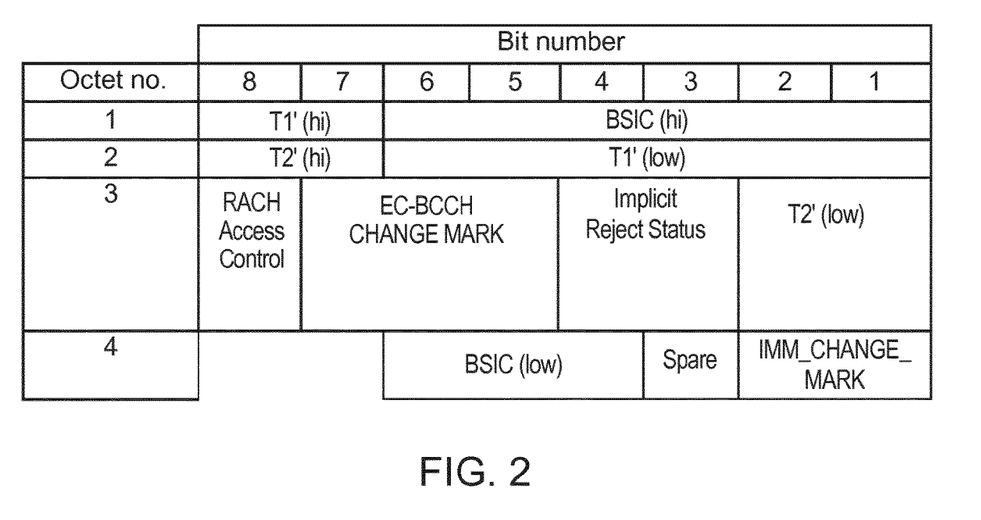
FIG. 2 shows an inclusion of an idle mode mobility change mark indication in EC-SCH Information in accordance with the example embodiments of the invention.

As shown in FIG. 2 there is EC-SCH Information carried over EC-SCH of the cell which contains following additional information, e.g. replacing two spare bits in octet 4.

Two spare bits in octet 4 are replaced by the idle mode mobility change mark indication IMM_CHANGE_MARK. This signals the information as depicted in FIG. 2 and described above.

In case the change mark indication IMM_CHANGE_MARK on the EC-SCH signals a predefined setting—in the example above "00"—the MS assumes that the cell does not support an EC-WUCH and proceeds in acquiring the complete system information in the new cell.

In case the IMM_CHANGE_MARK on the EC-SCH of the new serving cell does not equal the one received in the previous serving cell, the MS determines that the parameters relevant for paging reception have changed in the group of cells with the same routing area and the same cell reselection parameters since it last time received IMM_CHANGE_MARK and proceeds in acquiring the complete system information in the new cell.

Otherwise it proceeds with reading the information sent in the EC-WUCH. For this it reads, depending on where the EC-WUCH is placed, e.g. in FN15-16 or FN 15-18 (see below) in an odd 51-multiframe, the EC-CCCH configuration used in the cell (i.e. 1 . . . 4 EC-CCCH configured in the new cell) to derive its paging group in the respective EC_CCCH_GROUP. By this a fast identification of the paging channel in the new cell is achieved without the need to read the EC SI in the new cell.

Figure 3:
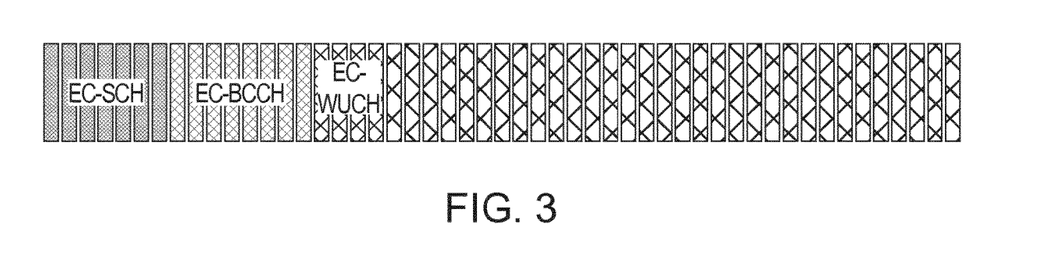
FIG. 3 shows a mapping of EC-WUCH onto an odd numbered 51-multiframe in accordance with the example embodiments of the invention.

FIG. 3 shows a mapping of EC-WUCH onto an odd numbered 51-multiframe in accordance with the example embodiments of the invention. As shown in FIG. 3, the mapping of the EC-SCH and the new EC-WUCH onto the 51-multiframe (odd numbered) is illustrated.

As shown in FIG. 3, the EC-SCH indicates the presence of EC-WUCH via IMM•CHANGE•MARK field. If EC-WUCH is present, UE reads the EC-WUCH in FN15-FN16/FN15-FN18 (2 or 4 TDMA frames) depending on channel coding, and number of bits to be conveyed. (For 2 bits of the configured number of EC-CCCH (EC-CCCH-CHAN), two TDMA frames will be sufficient). Further, the EC-WUCH may be repeated in next 51 MF also if the link level performance of EC-WUCH requires additional transmissions.

If, as in the GSM related example above, the neighbor cell information informs a MS about cells with the same routing area and the same cell reselection parameters as the serving cell, a paging cell group identifier is not needed. (This is similar to NB-IoT where a paging cell group identifier is also not indispensable if there is an Idle-mode-configuration-same-as-Serving-cell parameter.) However, a paging cell group identifier is not excluded in GSM either. In GSM, a paging cell group identifier may for example be transmitted on the EC-WUCH.

The EC-Idle-Mobility-Value-Tag, the idle mode mobility change mark indication (IMM_CHANGE_MARK), and the idle-mode-config-value-tag are examples of the idle mode value tag.

In case of a communication network serving PEO mobiles, the neighbour cell information in the serving cell needs to comprise for each or any one or more neighbour cell: i) if it belongs to the same routing area as the serving cell, ii) if it belongs to the same group of cells as the serving cell with same cell reselection parameters, iii) if it has the same paging configuration as the serving cell and iv) if it supports a wake-up channel (WUCH). Based on this information the PEO mobile determines, if after cell reselection to a neighbour cell, it may skip reading of system information, as depicted above, and monitor its paging block or the corresponding WUCH of the new cell. The WUCH (e.g. in FN6-FN9 of the 51-multiframe) in a cell carries the idle mode mobility change mark indication IMM•CHANGE•MARK (e.g. 2 bits), to indicate whether a change occurred in idle mode mobility related parameters among the cells which have a same idle mode configuration, further the number of supported CCCHs in the cell (e.g. 2 bits) and may convey additional information (e.g. 8 bits) such as an indication of the presence of a paging request for a specific paging group in the same or in the following 51-multiframe (in total 8 paging blocks can be sent in the remainder of the 51-multiframe, thus 8 bits are needed). After decoding the WUCH, the PEO mobile identifies if the idle mode mobility change mark indication for the new cell is the same as that in the serving cell: i) if it is same, it may go-back-to sleep if no page is identified or continue to receive its paging block if its presence is indicated in the WUCH. ii) if it is not same, it performs system information acquisition in the new cell to identify its paging block and then starts listening to its paging block or the corresponding WUCH, the latter if the WUCH conveys additional information about the presence of a paging request per each paging group.

It is noted that the terms routing area and tracking area; and mobile station (MS) and user equipment (UE) as used in this description are not limiting to any particular communication technology or their operations, and these terms may be used interchangeably.

Figure 5A:
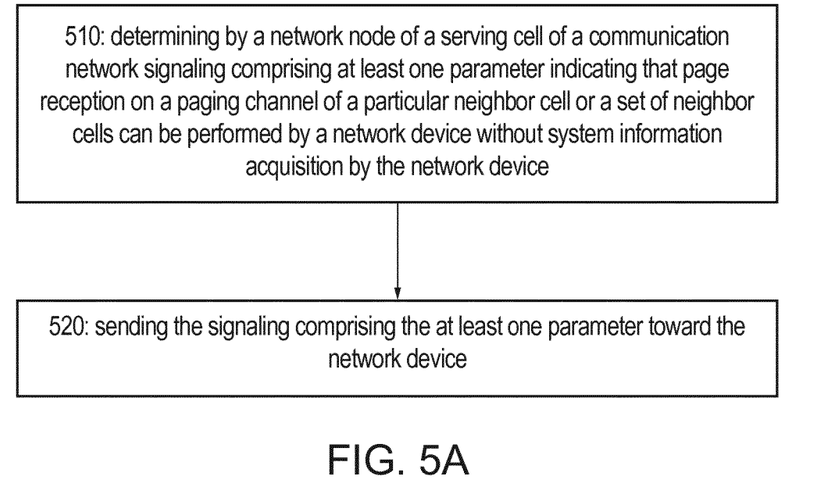
FIGS. 5A and 5B each show a method in accordance with example embodiments of the invention which may be performed by an apparatus.

FIG. 5A illustrates operations which may be performed by a network node such as, but not limited to, a network node gNB 170 as in FIG. 4 or an eNB. As shown in step 510 of FIG. 5A there is determining by a network node of a serving cell of a communication network signaling comprising at least one parameter indicating that page reception on a paging channel of a particular neighbor cell or a set of neighbor cells can be performed by a network device without system information acquisition by the network device. Then as shown in step 520 of FIG. 5A there is sending the signaling comprising the at least one parameter toward the network device.

In accordance with the example embodiments as described in the paragraph above, the at least one parameter causes the network device to listen for a paging message on a paging channel associated with the neighbor cell without the system information acquisition.

In accordance with the example embodiments as described in the paragraphs above, each cell of the set of neighbor cells have a same configuration for idle mode parameters related to paging reception, wherein the signaling is broadcast, and wherein the broadcast signaling comprises an information block identifying a paging group identity for the set of neighbor cells and identifying cells having a same paging configuration and idle mode parameters as the serving cell.

In accordance with the example embodiments as described in the paragraphs above, the signaling or part of it is sent in one of EC System Information and NB-IoT System Information.

In accordance with the example embodiments as described in the paragraphs above, the signalling is identifying a system information change for idle mode parameters for all cells of the set of neighbour cells.

In accordance with the example embodiments as described in the paragraphs above, the signaling or part of it is transmitted in every 2*51 MF over 4 consecutive TDMA frames of a common control channel from FN15-FN18 or over 2 TDMA frames (FN15-FN16).

In accordance with the example embodiments as described in the paragraphs above, the signaling comprises an indicator indicating one or more extended coverage common control channels configured in a same cell.

In accordance with the example embodiments as described in the paragraphs above, the indicator is indicating 4 different values using 2 Bits.

In accordance with the example embodiments as described in the paragraphs above, there is sending toward the network device an idle mode value tag, wherein the idle mode value tag keeps track of a change in idle mode mobility related parameters among the cells which have a same idle mode configuration.

In accordance with the example embodiments as described in the paragraphs above, the idle mode value tag is sent over an EC-SCH.

In accordance with the example embodiments as described in the paragraphs above, the at least one parameter is indicative of whether the neighbor cell belongs to a same tracking/routing area as the serving cell, whether the neighbor cell has a same paging configuration as the serving cell, whether the neighbor cell's and serving cell's idle mode configuration are the same, and whether cell reselection parameters in the neighbor cell are the same as in the serving cell.

In accordance with the example embodiments as described in the paragraphs above, the parameter indicative of whether the neighbor cell has the same paging configuration as the serving cell is based on at least one of a discontinuous reception cycle, a number of paging occasions within a discontinuous reception cycle of the neighbor cell, and a maximum number of repetitions of a paging message.

In accordance with the example embodiments as described in the paragraphs above, the at least one parameter is indicative of whether cell reselection parameters of the neighbor cell are same as the cell reselection parameters sent from the serving cell.

In accordance with the example embodiments as described in the paragraphs above, the at least one parameter comprises an indication of a paging cell group identifier identifying cells having a same paging configuration and idle mode parameters as the serving cell.

In accordance with the example embodiments as described in the paragraphs above, the at least one parameter comprises an idle mode value tag, and wherein the idle mode value tag is indicating whether there is a change of idle mode parameters among the group of cells during the cell reselection.

In accordance with the example embodiments as described in the paragraphs above, the serving cell signals at least one parameter indicating for at least one neighbor cell whether the neighbor cells is belonging to a same routing area as the serving cell, whether the neighbor cell has the same paging configuration as the serving cell, whether the neighbor cells supports a wake-up channel and whether the neighbor cells cell reselection parameters are same as for the serving cell, and the serving cell signals whether a change occurred in idle mode mobility related parameters among the cells which have a same idle mode configuration, wherein the signaling is dedicated to devices in Power Efficient Operation.

In accordance with the example embodiments as described in the paragraphs above, the signaling or part of it is sent over a common control channel of the one or more extended common control channels in each cell.

A non-transitory computer-readable medium (Memory(ies) 155 of FIG. 4) storing program code (Computer Program Code 153 and/or PPg Module 150-2 of FIG. 4), the program code executed by at least one processor (Processor(s) 152 and/or PPg Module 150-1 of FIG. 4) to perform the operations as at least described in the paragraphs above.

In accordance with an example embodiment of the invention as described above there is an apparatus comprising: means for determining (Computer Program Code 153 and/or PPg Module 150-2; and Processor(s) 152 and/or PPg Module 150-1 of FIG. 4) by a network node (gNB 170 of FIG. 4) of a serving cell of a communication network (Network 100 of FIG. 4) signaling comprising at least one parameter indicating that page reception on a paging channel of a particular neighbor cell or a set of neighbor cells can be performed by a network device (UE 110 of FIG. 4) without system information acquisition by the network device; and means for sending (Transceivers 160 of FIG. 4) the signaling comprising the at least one parameter toward the network device.

In the example aspect of the invention according to the paragraph above, wherein at least the means for determining and sending comprises a non-transitory computer readable medium [Memory(ies) 155 and/or PPg Module 50-2 of FIG. 4] encoded with a computer program [Computer Program Code 153 and/or PPg Module 150-2 of FIG. 4)] executable by at least one processor [Processor(s) 152 and/or PPg Module 150-1 of FIG. 4].

Figure 5B:
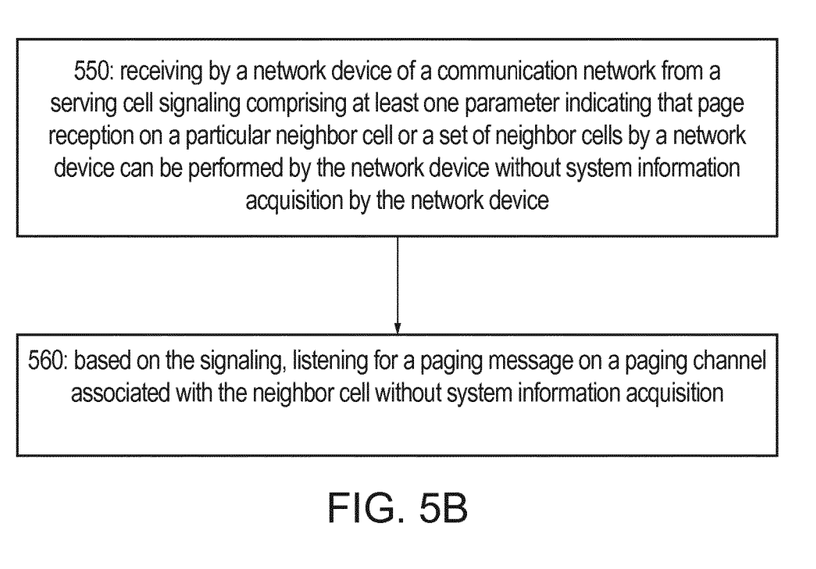

FIG. 5B illustrates operations which may be performed by a network device such as, but not limited to, a network device UE 110 as in FIG. 4 or an MS. As shown in step 550 of FIG. 5B there is receiving by a network device of a communication network from a serving cell signaling comprising at least one parameter indicating that page reception on a particular neighbor cell or a set of neighbor cells by a network device can be performed by the network device without system information acquisition by the network device. Then as shown in step 560 of FIG. 5B there is, based on the signaling, listening for a paging message on a paging channel associated with the neighbor cell without system information acquisition.

In accordance with the example embodiments as described in the paragraph above, each cell of the set of neighbor cells have a same configuration for idle mode parameters related to paging reception, wherein the signaling is broadcast, and wherein the broadcast signaling comprises a master information block identifying a paging group identity for the set of neighbor cells.

In accordance with the example embodiments as described in the paragraphs above, the signaling is received in one of EC System Information and NB System Information for IoT.

In accordance with the example embodiments as described in the paragraphs above, the signaling is received in every 2*51 MF over 4 consecutive TDMA frames of a common control channel from FN15-FN18 or over 2 TDMA frames (FN15-FN16).

In accordance with the example embodiments as described in the paragraphs above, the signaling comprises an indicator indicating one or more extended coverage common control channels configured in a same cell.

In accordance with the example embodiments as described in the paragraphs above, the indicator is indicating 4 different values using 2 Bits.

In accordance with the example embodiments as described in the paragraphs above, there is receiving from the serving cell signaling comprising an extended coverage value tag using 2 bits, wherein the extended coverage value tag keeps track of a change in idle mode mobility related parameters among the cells which have a same idle mode configuration.

In accordance with the example embodiments as described in the paragraphs above, the signaling comprising the extended coverage value tag is received over an EC-SCH.

In accordance with the example embodiments as described in the paragraphs above, the at least one parameter is used in place of a system information value tag.

In accordance with the example embodiments as described in the paragraphs above, the at least one parameter is indicative of whether the neighbor cell belongs to a same tracking/routing area as the serving cell, whether the neighbor cell has a same paging configuration as the serving cell, whether the neighbor cell's and serving cell's idle mode configuration are the same, and whether cell reselection parameters in the neighbor cell are the same as in the serving cell.

In accordance with the example embodiments as described in the paragraphs above, the parameter indicative of whether the neighbor cell has the same paging configuration as the serving cell is based on at least one of a discontinuous reception cycle, and a number of paging occasions within a discontinuous reception cycle of the neighbor cell.

In accordance with the example embodiments as described in the paragraphs above, the at least one parameter is indicative of whether cell reselection parameters of the neighbor cell are same as the cell reselection parameters sent from the serving cell.

In accordance with the example embodiments as described in the paragraphs above, the at least one parameter comprises an indication of a paging cell group identifier identifying cells having a same paging configuration and idle mode parameters as the serving cell.

In accordance with the example embodiments as described in the paragraphs above, there is reading a physical cell identifier from the neighbour cell as part of cell reselection; based on the at least one parameter indicating that the neighbor cell having the same paging configuration as the serving cell, listen for the paging message on the paging channel without prior acquiring system information of a new serving cell selected by the network device.

In accordance with the example embodiments as described in the paragraphs above, there is, after synchronization, using the information sent in an extended coverage synchronization channel and at least in one extended coverage common control channel of a number of extended coverage common control channels in the new serving cell to identify an extended coverage common control channel block corresponding to a paging group of the new serving cell without the system information acquisition by the network device.

In accordance with the example embodiments as described in the paragraphs above, there is receiving in the serving cell at least one parameter indicating at least one of whether each cell of a set of neighbor cells is belonging to a same routing area as the serving cell, whether each cell of a set of neighbor cells has the same paging configuration as the serving cell, whether each cell of a set of neighbor cells supports a wake-up channel, whether for each cell of a set of neighbor cells the cell reselection parameters are same as for the serving cell, and the serving cell signals whether a change occurred in idle mode mobility related parameters among the cells which have a same idle mode configuration; after cell reselection and synchronization to the new serving cell, using the information, sent at least in one common control channel of a number of common control channels in the new serving cell, to identify a common control channel block corresponding to a paging group of the new serving cell without system information acquisition by the network device and to identify a change of idle mode mobility parameters in the new serving cell; and using this information to determine whether to read system information of the new serving cell prior to monitoring of paging messages, wherein the network device has been configured to maintain Power Efficient Operation.

A non-transitory computer-readable medium (Memory(ies) 125 of FIG. 4) storing program code (Computer Program Code 123 and/or PPg Module 140-2 of FIG. 4), the program code executed by at least one processor (Processor(s) 120 and/or PPg Module 140-1 of FIG. 4) to perform the operations as at least described in the paragraphs above.

In accordance with an example embodiment of the invention as described above there is an apparatus comprising: means for receiving (transceivers 130 of FIG. 4) by a network device (UE 110 of FIG. 4) of a communication network (Network 100 of FIG. 4) from a serving cell (e.g., gNb 170 of FIG. 4) signaling comprising at least one parameter indicating that page reception on a particular neighbor cell or a set of neighbor cells by a network device can be performed by the network device without system information acquisition by the network device; and means based on the signaling, for listening (Computer Program Code 123 and/or PPg Module 140-2; and Processor(s) 120 and/or PPg Module 140-1 of FIG. 4) for a paging message on a paging channel associated with the neighbor cell without system information acquisition.

In the example aspect of the invention according to the paragraph above, wherein at least the means for receiving and listening comprises a non-transitory computer readable medium [Memory(ies) 125 and/or PPg Module 140-2 of FIG. 4] encoded with a computer program [Computer Program Code 123 and/or PPg Module 140-2 of FIG. 4)] executable by at least one processor [Processor(s) 120 and/or PPg Module 140-1 of FIG. 4].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, even inside the examples, signaling details w.r.t. the number of bits and the position of the signaling on a logical channel should not limit the scope of the examples.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention. Also the combination of aspects, e.g. aspects described with respect to NB-IoT, aspects described with respect to EC-GSM-IoT and/or aspects described w.r.t. PEO, will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one non-transitory memory including computer program code, where the at least one memory and the computer program code are configured, with the at least one processor, to cause the apparatus to at least:
      determine by a network node of a serving cell of a communication network signaling comprising at least one parameter indicating that page reception on a paging channel of a particular neighbor cell or a set of neighbor cells can be performed by a network device without system information acquisition by the network device;
      send the signaling, comprising the at least one parameter, toward the network device, and
      send, toward the network device, signaling comprising an idle mode value tag, wherein the idle mode value tag is configured to be used to keep track of a change in idle mode mobility related parameters among the cells which have a same idle mode configuration.

2. The apparatus as in claim 1 where each cell of the set of neighbor cells have a same configuration for idle mode parameters related to paging reception and/or cell reselection.

3. The apparatus as in claim 2 where the signaling is configured to identify a system information change for idle mode parameters for all cells of the set of neighbor cells.

4. The apparatus as in claim 3 where the signaling, or a part of the signaling, is transmitted in every 2*51 MF over 4 consecutive TDMA frames of a common control channel from FN15-FN18 or over 2 TDMA frames (FN15-FN16).

5. The apparatus as in claim 4 where the signaling comprises an indicator indicating one or more extended coverage common control channels configured in a same cell.

6. The apparatus as in claim 5 where the indicator is indicating four different values using 2 Bits.

7. The apparatus as in claim 1 where the idle mode value tag is sent over an EC-SCH.

8. The apparatus as in claim 1 where the at least one parameter is indicative of whether the neighbor cell belongs to a same tracking/routing area as the serving cell, whether the neighbor cell has a same paging configuration as the serving cell, whether the neighbor cell's and serving cell's idle mode configuration are the same, and/or whether cell reselection parameters in the neighbor cell are the same as in the serving cell, where the parameter indicative of whether the neighbor cell has the same paging configuration as the serving cell is based on at least one of a discontinuous reception cycle, a number of paging occasions within a discontinuous reception cycle of the neighbor cell, and a maximum number of repetitions of a paging message.

9. The apparatus as in claim 1 where the at least one parameter is set based upon a determination that
   the neighbouring cell belongs to a same routing/tracking area as the serving cell, and/or
   the neighbouring cell shares a same paging configuration as the serving cell, and/or
   cell reselection parameters of a new cell are same as the serving cell.

10. The apparatus as in claim 1 where the apparatus is further configured to receive from the serving cell signaling comprising an extended coverage value tag using two bits, wherein the extended coverage value tag is configured to be used to keep track of a change in idle mode mobility related parameters among the cells which have a same idle mode configuration.

11. The apparatus as in claim 10 where the signaling comprising the extended coverage value tag is received over an EC-SCH.

12. The apparatus as in claim 10 wherein the signaling comprises an indicator indicating one or more extended coverage common control channels configured in a same cell.

13. A method comprising:
   determining by a network node of a serving cell of a communication network signaling comprising at least one parameter indicating that page reception on a paging channel of a particular neighbor cell or a set of neighbor cells can be performed by a network device without system information acquisition by the network device;
   sending the signaling comprising the at least one parameter toward the network device; and
   sending toward the network device signaling comprising an idle mode value tag, wherein the idle mode value tag keeps track of a change in idle mode mobility related parameters among the cells which have a same idle mode configuration.

14. A non-transitory computer-readable medium storing program code, the program code executed by at least one processor to perform at least the method as claimed in claim 13.

15. A method comprising:
receiving by a network device of a communication network from a serving cell signaling comprising at least one parameter indicating that page reception on a particular neighbor cell or a set of neighbor cells by a network device can be performed by the network device without system information acquisition by the network device;
based on the signaling, listening for a paging message on a paging channel associated with the neighbor cell without system information acquisition; and
receiving from the serving cell signaling comprising an extended coverage value tag using 2 bits, wherein the extended coverage value tag keeps track of a change in idle mode mobility related parameters among the cells which have a same idle mode configuration.

* * * * *